United States Patent [19]

Bartlett

[11] Patent Number: 5,296,797
[45] Date of Patent: Mar. 22, 1994

[54] PULSE MODULATED BATTERY CHARGING SYSTEM

[75] Inventor: William H. Bartlett, Lake View Terrace, Calif.

[73] Assignee: Byrd Electronics Corp., Arcadia, Calif.

[21] Appl. No.: 891,960

[22] Filed: Jun. 2, 1992

[51] Int. Cl.$^5$ .............................................. H02J 7/10
[52] U.S. Cl. .......................................... 320/21; 320/39
[58] Field of Search ....................... 320/21, 22, 23, 24, 320/31, 32, 39, 40

[56] References Cited

U.S. PATENT DOCUMENTS

| | | | |
|---|---|---|---|
| 3,602,794 | 8/1971 | Westhaver | 320/39 |
| 4,371,826 | 2/1983 | Shelly | 320/21 |
| 4,607,208 | 8/1986 | Vreeland | 320/21 |
| 4,636,706 | 1/1987 | Bowman et al. | 320/21 X |
| 4,639,656 | 1/1987 | Mukai | 320/22 |
| 4,661,758 | 4/1987 | Whittaker | 320/21 |
| 4,777,424 | 10/1988 | Sakamura et al. | 320/21 |

Primary Examiner—Kristine L. Peckman
Attorney, Agent, or Firm—William W. Haefliger

[57] ABSTRACT

A pulse width modulated battery charging system that applies constant current at a set voltage acceptable to the battery under charge and applied by a 90% duty cycle pulse until approximately two thirds of a full battery condition is reached, followed by gradually diminishing pulse width to 10% of said current and voltage as full charge is approached, and terminated when full charge is reached, and characterized by sensing battery condition during dwell between pulse charges and increasing the dwell for battery recovery from the affects of previous pulse charges.

15 Claims, 10 Drawing Sheets

FIG. 3.
M, I, O, D & E

FIG. 4. PULSE WIDTH MODULATOR MEANS M

FIG. 5. START DIMINISHING PULSE

FIG. 6.

FIG. 7.
CHARGE INHIBITING MEANS I

FIG. 8.
CHARGE ON-OFF MEANS O

FIG. 9. CHARGE CURRENT CONTROL MEANS C

FIG. 10. OVERVOLTAGE PROTECTION MEANS D

PULSE MODULATED BATTERY CHARGING SYSTEM

This invention relates to the maintenance of batteries, and particularly to those of the Nickel-Cadmium type or the like, that are adversely affected by rapid charging and which are damaged by overcharging. Heretofore, so-called Ni-Cad batteries have been discharged to a predetermined low voltage, and then recharged a predetermined number of ampere hours not to exceed battery capacity. This procedure presumably precludes overcharging, but said procedure is often impractical to follow, with the result that batteries are unwittingly damaged and often destroyed by improper charging. Firstly, by charging too rapidly, and secondly by over charging, with the result that ampere-hour capacity is reduced and in severe instances destroyed. Therefore, it is an object of this invention to provide a system that prevents battery damage during the charging cycle thereof.

The battery charging system herein disclosed employs the pulse concept of intermittently applying amperes to the battery cell, in this instance a Nickel-Cadmium cell, or series of such cells. And it is state of the art cells with which this invention is concerned, involving sealed cells that employ cadmium for the negative electrode, nickel oxide for the positive electrode, and a solution of potassium hydroxide for the electrolyte. In the discharged state, nickel hydroxide is the active material of the positive electrode, and cadmium hydroxide that of the negative. During charge, the nickel hydroxide is converted to a higher valence oxide at the negative electrode, and the cadmium hydroxide is reduced to cadmium. Characteristically, the Ni-Cad cell is sealed with a membrane and is based upon the use of a negative electrode having a higher effective capacity than the positive electrode. During charge, the positive electrode reaches full charge before the negative electrode and begins to expel oxygen. The oxygen migrates to the negative electrode where it reacts with and oxidizes or discharges the cadmium so as to produce cadmium hydroxide. A separator or the membrane is permeable to the oxygen and is used as the oxygen can pass through it to the negative electrode, Also, a limited amount of electrolyte is used in these cells (a so called starved electrolyte system) as this facilitates the transfer of oxygen.

Nickel-Cadmium battery capacity and ultimate life are very sensitive to heat developed therein during charging, and it is generally accepted that they can be safely charged at one-tenth of their rated capacity. For example, the 1.2 amp/hr cell can be charged at 0.12 amp/hr without incurring damaging internal heat therein. However, when charged in excess of this accepted rate, the chemical reactions cannot occur or dissipate rapidly enough, with the result that internal resistance increases which results in the generation of damaging heat. Prior art chargers have traded off heat increase for fast charge time, which is usually much faster than one-third the amp/hr steady charge rate capacity of the battery. Therefore, heat sensing systems have been used to terminate the charge when the battery reaches some preset limit. The fast cycle charge is then terminated and a maintenance charge is applied, usually one-tenth of the amp/hr rate, and maintained until the battery is removed from the charger for service. Pressure increases with temperature. Such batteries are built with a pressure release vent and/or a breakable membrane as a safety feature. As a result, when the safety vent temperature is reached, electrolyte will discharge with a commensurate reduction in charge capacity. Excessive heat will simply break the membrane seal.

Batteries that have been over heated during charge, or that have been overcharged, develop a "memory", a term which is applied to the foregoing phenomenon of expelling electrolyte or oxygen; also known as "gassing". It is a general object of this invention to keep the battery cell well below the gassing temperature during charge and especially at full charge, whereby an adverse memory condition is avoided and does not occur. With the present invention, not only is the battery protected, but also any equipment in circuit with the battery, such as a transceiver or the like.

It is an object of this invention to charge a battery compatible with its voltage condition, by modulating the width of a voltage pulse, and thereby applying a commensurate amperage into the battery chemistry. In practice, there is a power supply that produces a fixedly regulated voltage and amperage adjusted as required for the battery or group of batteries to be serviced. In accordance with this invention it is the frequency and spacing of this width modulated pulse that determines the amperage input into the battery cell.

It is an object of this invention to provide a clock and control means by which a pulse is timed and with a carry count during which battery voltage is sensed and during which the battery cell is permitted to recuperate. It is during this period of time that a voltage check is made on the battery, and which determines the subsequent rate of charging.

Through empirical application it has been determined that an acceptable heat rise within the battery cell dictates a limited amperage to be applied. Accordingly, it is an object of this invention to apply an acceptable voltage-amperage level compatible with the pulse employed, for example a 90% duty pulse cycle applied at the selected Watt input continued from any low initial battery voltage to approximately two-thirds of a full battery charge.

It is another object of this invention to reduce the Watt input during the final topping off of the full battery charge, and still a further object to proportionately reduce the Watt input into the battery as a full charge is being reached. A feature that evolves from these and the foregoing objects and from the combination of means hereinafter described is that the charge pulses are separated by dwell periods during which the battery cell chemistry is permitted to recuperate, thereby avoiding gassing and discharge thereof and preventing adverse memory.

SUMMARY OF THE INVENTION

The battery charging system of this invention provides a battery voltage sensitive charging-circuit. In practice, there are two power circuits, one regulated at 10.45 volts and supplying the system circuitry, and the other regulated to supply the battery charging voltage and current, limited to a maximum current and maximum voltage. This sensing and charging circuit is powered from an external voltage source of a selected voltage, for example with a current capacity of 2 amps at 12 volts. The battery voltage is sensed and charge current reduced as battery voltage conditions dictate. Both the maximum voltage and current at the battery charge terminals is limited, there being a back-up safety circuit for over voltage in the event that the charging voltage regulator fails.

This charging system uses a pulse width modulating means, with a duty cycle between 5% and 77% battery charge. This duty cycle and charge range gives the battery chemistry time for the oxygen to be reabsorbed into the negative electrode during the off portion of the pulse cycle, with no adverse increase in battery temperature, while providing a substantially rapid battery charge. Overheating and outgassing are eliminated.

The battery charging current is maintained in proportion to the chemical recombination rate of the battery cell so as to prevent the buildup of pressure that would be caused by excessive heat, usually between ⅛ and 1/5 the ampere-hour rate of the battery. It is generally accepted that batteries of the type under consideration can be charged at 1/14 of the ampere-hour capacity of the battery, without excessive heating of the battery cell. Further, the internal cell pressure is sensitive to charge current, ambient temperature, the reactivity of the negative electrode, and to the electrolyte level, all of which is reflected in the internal resistance of the battery being charged. And, solid cadmium, gaseous oxygen, and liquid water must coexist in mutual contact for their recombination reaction to occur. When internal cell pressure is too high, out-gassing occurs, the safety membrane will be breached, with a consequent electrolyte loss that results in diminished battery capacity.

In practicing this invention, the charge current is pulsed ON at one times the amp/hr rate of the battery and then turned OFF for a brief time so as to permit the chemical recombination reaction to occur completely. The charge pulse is initially modulated to turn ON and OFF at a 90% duty cycle until the battery is up to the 70%–77% charge level, after which the pulse width is modulated proportionately shorter and shorter until a 100% battery charge level is reached, whereupon the charging pulse is reduced to as little as 10% and finally terminated. Only when the battery is sensed as "LOW" does the charging commence, and then at the duty cycle that is required for the voltage sensed.

This battery charging system is entirely automatic, with indicator light means that displays system and battery condition. As hereinafter described, a tri-color light emitting diode is employed as follows: The color GREEN indicates that the system is ON, a long pulse thereof indicating no battery installed or that it is not being charged. The color ORANGE indicates that the system is charging, a longer or shorter pulse indicating the state of charge. The color RED indicates that the battery shows shorted. And, no color indicates that the battery is fully charged.

State of the art batteries vary in complexity, in that there are pure battery cells, and there are those which include protective circuitry. For example, there are batteries with resistor circuits at their poles and a third condition sensing contact, and there are simple two contact cells. Accordingly, it is an object of this invention to accomodate either type of battery and sense its true condition for recharging purposes.

The foregoing and various other objects and features of this invention will be apparent and fully understood from the following detailed description of the typical preferred forms and applications thereof, throughout which reference is made to the accompanying drawings.

THE DRAWINGS

FIGS. 13 through 17 are basic circuit diagrams of the integrated circuits employed.

PREFERRED EMBODIMENT

Figure 1:
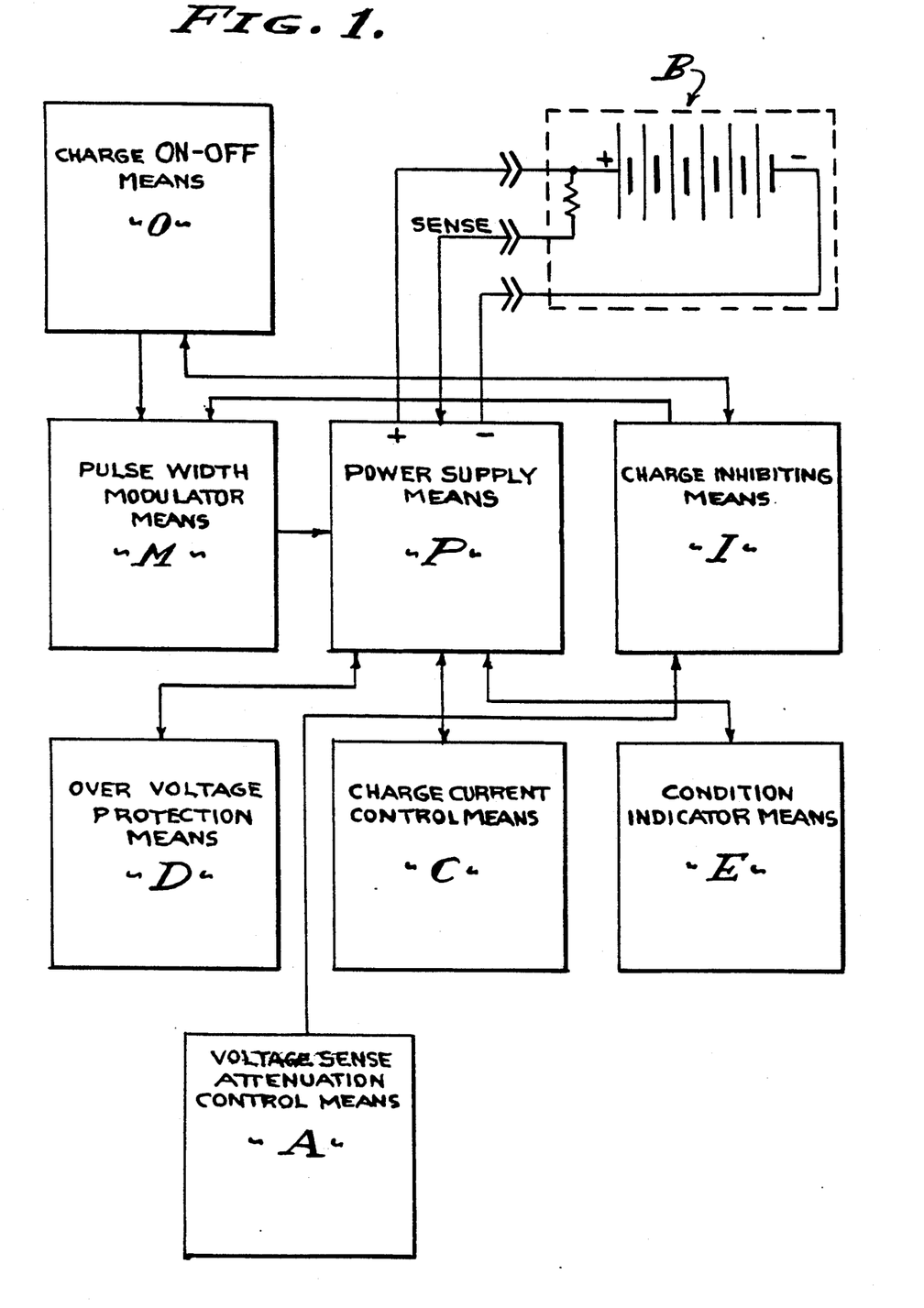
FIG. 1 is a block diagram of the battery charging system of the present invention, applied to a three contact battery unit having a sense circuit.
Figure 2:
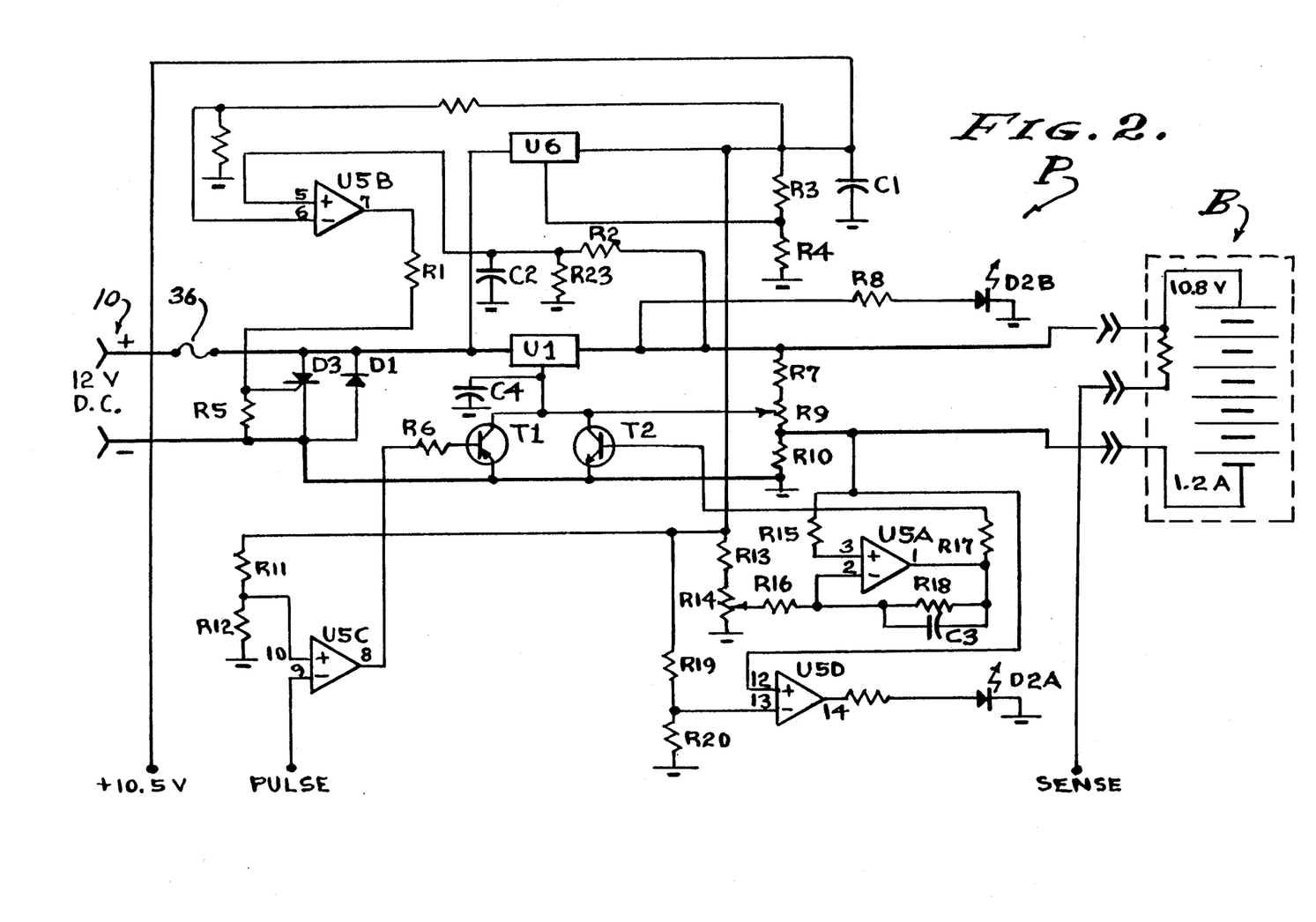
FIG. 2 is a schematic of the pulse controlled power supply.

Referring now to FIG. 1 of the drawings, the Pulse Modulated Battery Charging System involves, generally, a power supply means P with a battery charging output as controlled by associated means in combination therewith, as follows: A pulse width modulator means M varies the duty cycle by changing the width or duration of the pulse and separation of pulses so as to apply charging current according to the capacity of the battery B to accept the same. A charge inhibiting means I permits full 90% duty cycle charging of the battery until a 70%–77% charge thereof is reached. A charge ON-OFF control means O turns on the charge circuit when the battery B is sensed as discharged, and which then turns off the charge circuit when the battery B is sensed as fully charged. A charge current control means C senses the battery condition and limits the ampere charge applied, and on a diminishing basis after a 70%–77% charge thereof is reached. An overvoltage protection means D causes the power supply input fuse to blow in the event of voltage regulation failure or like adverse condition. And, a condition indicator means E presents a display to alert one as to (1) when the system is ON and whether the battery B is installed, (2) when the system is charging and to what degree thereof, (3) when the battery is shorted, and (4) when the battery B is fully charged. FIG. 2 of the drawings diagrams the power supply P and its closely associated circuitry, while FIG. 3 of the drawings diagrams the associated means M, I, O, D and E that are combined with the power supply P to control the same, as will be described.

Referring now to the power supply means P and particularly to FIG. 2 of the drawings, the power source is for example a 12 volt D.C. vehicle battery, and battery B to be charged is that of a portable transceiver. The system disclosed herein is designed to charge a 9 volt battery installed in a transceiver which is normally switched OFF during the charging operation, but which may be switched ON, there being protective circuitry in this system to protect both the battery and the tranceiver, or other like equipment, from excessive voltage. A feature is the dual circuitry, one circuit providing the operational voltage for the associated means, and the other the primary charge circuit that is pulsed according to the battery ability to receive the charge. Accordingly, means P is a dual power supply.

The external power source at 10 is at a voltage of 12 volts D.C. capable of delivering 1.8 amperes, and protected by a fast blow fuse$_{36}$, for example in a circuit from a cigarette lighter socket through a power cord to a transceiver (not shown). The power cord is deliberately long so as to act as a filter indicator together with a filter capacitor and diode D1 which prevents reverse voltage spikes and to protect against an incorrect supply connection to the circuit. This power supply circuit includes two integrated circuit (IC) voltage regulators U1 and U6, both of which are maximum current and temperature (internally) limited circuits. In carrying out this invention, integrated circuits U1 and U6 are 3-Terminal Adjustable Regulators, Type LM 317 manufactured by Texas Instruments, a schematic thereof being shown in FIG. 13. These are positive terminal voltage regulators that are adjustable to supply the required amperes at a given voltage, with overload protection.

Figure 13:
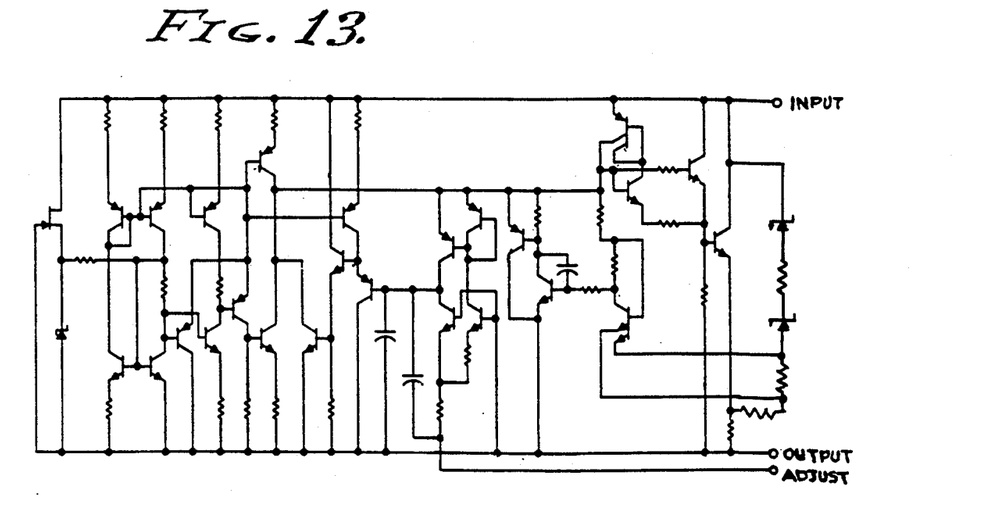
FIG. 13 being a schematic of voltage regulators U1 and U6.
Figure 14:
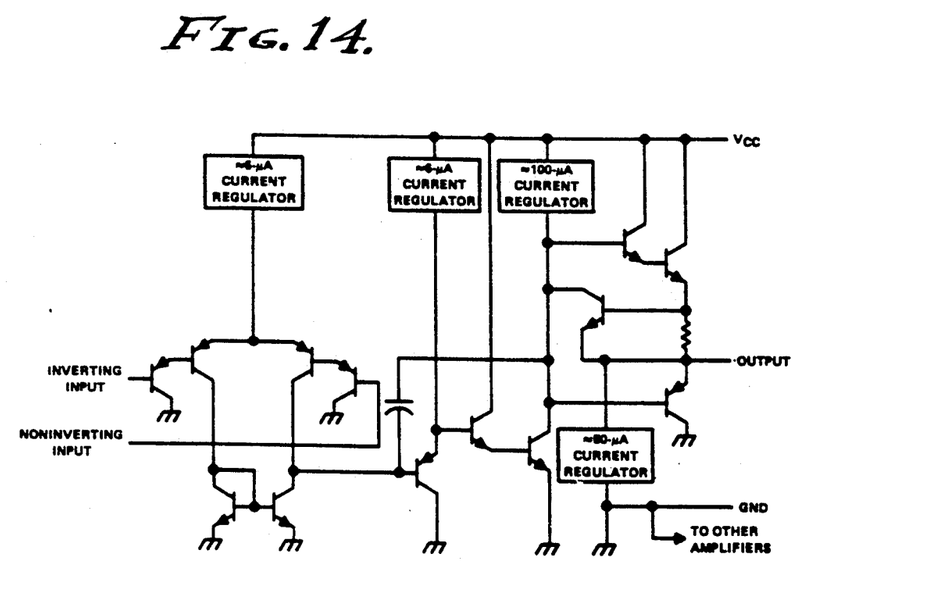
FIG. 14 being a schematic of one of the several operational amplifiers employed.

Integrated circuit U1 has its voltage set by the ratio of resistors R7 and R9 set for a safe maximum charging voltage of the battery under charge, for example from 1.2 to 10.5 volts as may be required. A safe current limit for the battery under charge is externally controlled through the current sensing resistor R10, and current gain is controlled by the function of differential amplifier U5A. In carrying out this invention, differential amplifier U5A is a Quadruple Operational Amplifier, Type LM 324 manufactured by Texas Instruments, a schematic thereof being shown in FIG. 14. This integrated circuit consists of four independent high-gain frequency compensated operational amplifiers operated from a single supply voltage, the low supply current drain being independent of the magnitude of the supply voltage. This operational amplifier sets the maximum current for the type of battery under charge, by comparing the voltage across the voltage divider made up of resistors R13 and R14 and the internal resistance drop across resistor R10. The resultant signal is then used to drive a transistor T2 to modulate the output of integrated circuit U1 by changing the ratio of resistors R7 and R9, thus limiting output current from less than 1 to 3 amperes. This regulator is also voltage modulated by the action of a transistor T1, the same clamping action as that of transistor T2, namely by the pulse width modulation circuit output of the integrated circuit U5C, later described. The voltage regulator U6 is of a standard configuration with its voltage set by the ratio of resistors R3 and R4 and is set for 10.5 volts. Filtering capacitors are as shown and as required.

Figure 3:
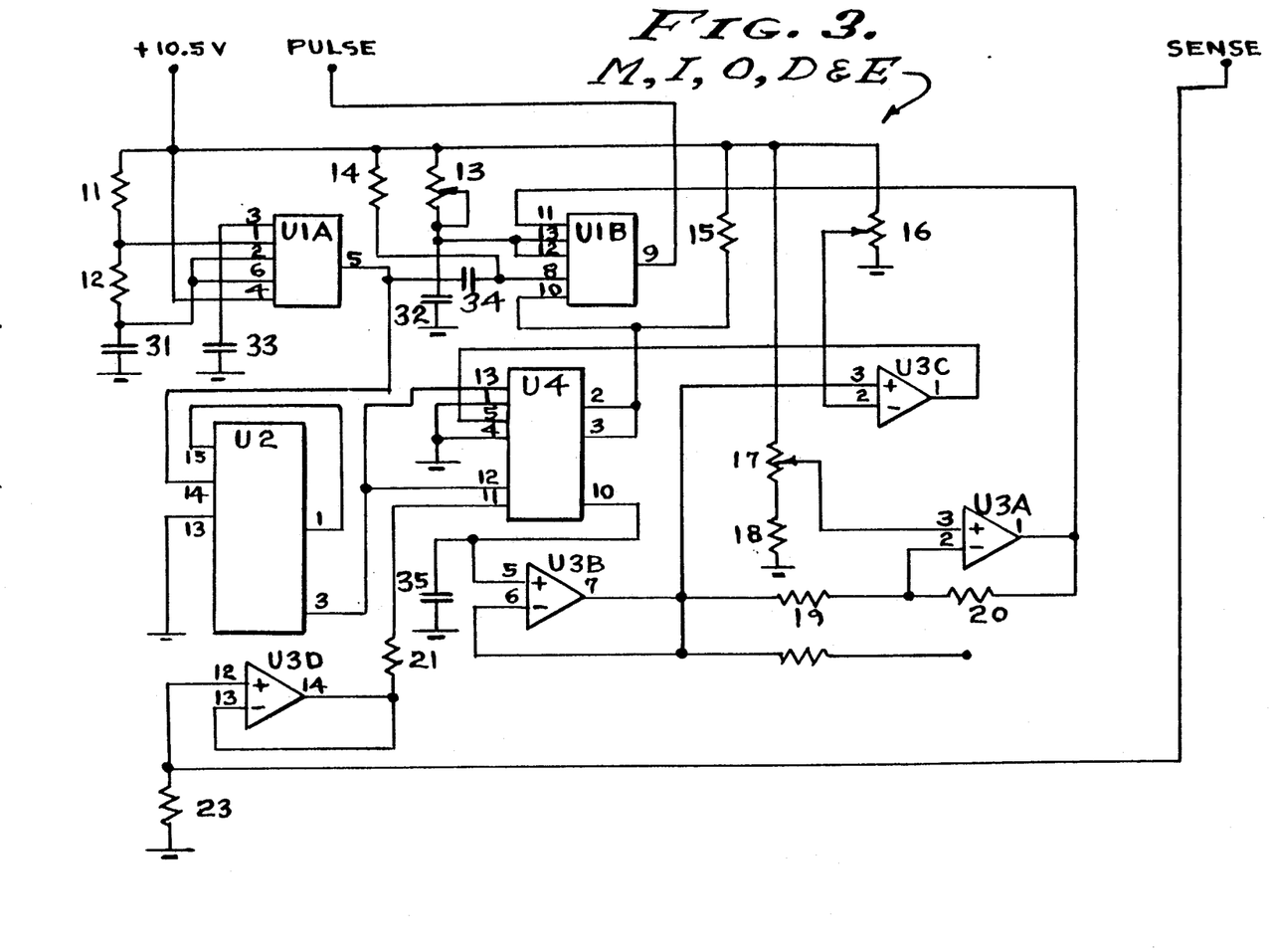
FIG. 3 is a schematic of the combined system means shown separately in the following figures.
Figure 4:
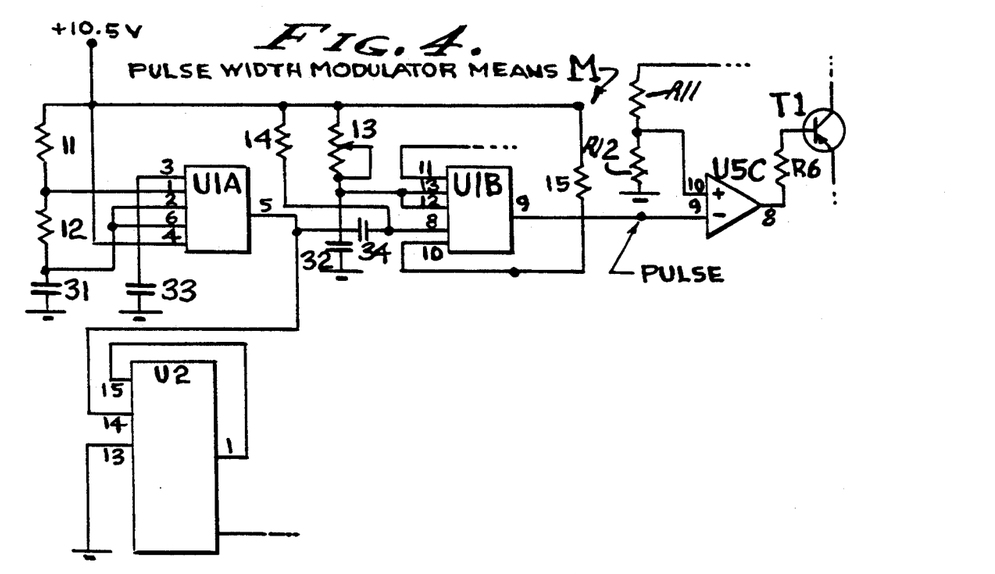
FIG. 4 is a schematic of the pulse width modulator means M.
Figure 5:
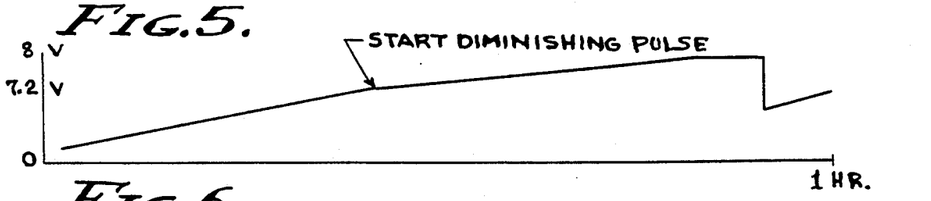
FIG. 5 is a graph of a typical charging curve, with straight line configuration.

Referring now to the pulse width modulator means M and particularly to FIG. 4 of the drawings, the power source is +10.5 volts from voltage regulator U6 of the power supply means P. This means M varies the pulse width duration as illustrated by the graphs b and e of FIG. 6, in order to diminish the pulse as shown in graph e; all of which occurs during the charge period of voltage buildup in the battery B as shown in the graph of FIG. 5. FIG. 4 illustrates the essential components of the pulse width modulator means M, separate from the associated system means combined therewith as shown in FIGS. 2 and 3.

Figure 6:
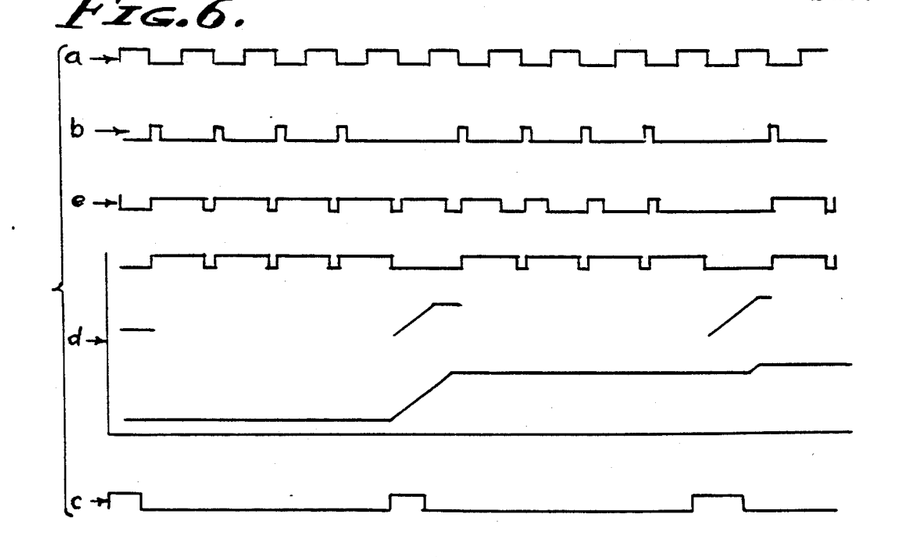
FIG. 6 shows composite graphs of the waveforms involved.
Figure 15:
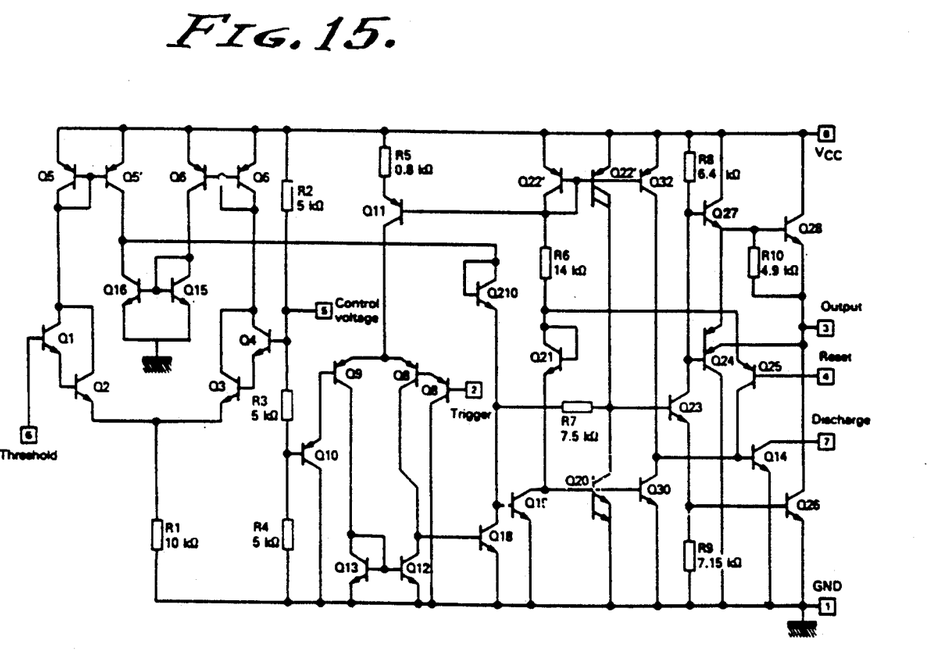
FIG. 15 is a schematic of the timer circuits U1A and U1B employed.
Figure 16:
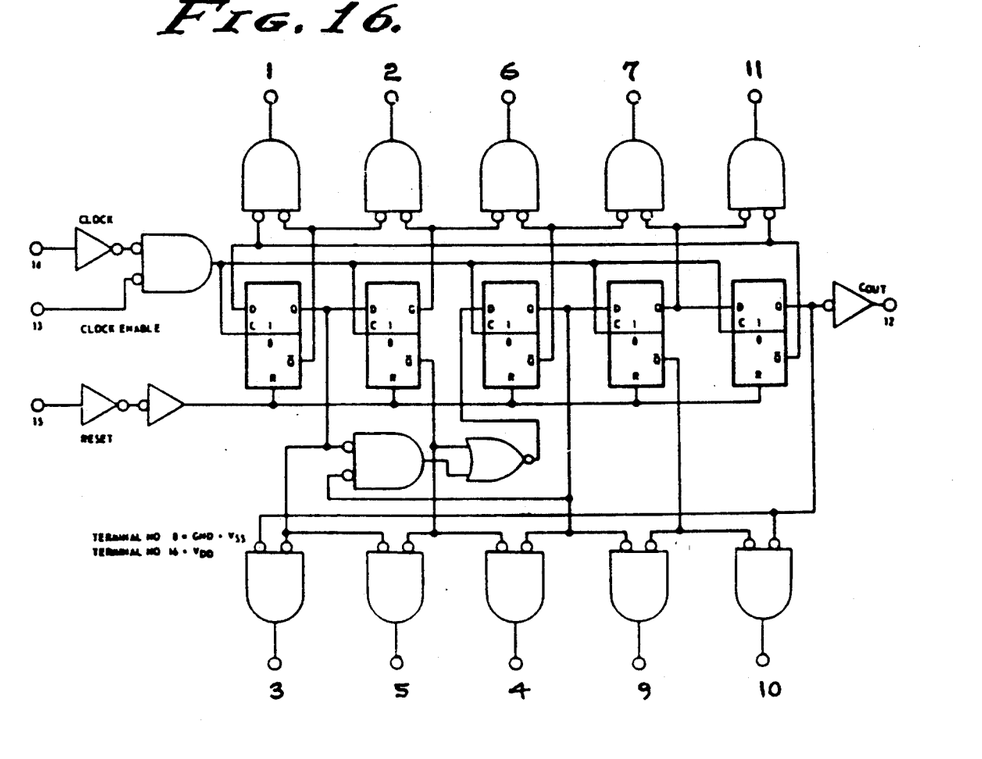
FIG. 16 is a schematic of the decade counter U2 employed.

A pulse width modulated current is passed through the voltage regulator U1 as follows: A master clock pulse is generated by a timer U1A, a free running astable multivibrator in conjunction with resistors 11 and 12, and a capacitor 31 operating as timing components that produce a 50% duty cycle square wave at pin 5 of master timer U1A (see FIG. 6a), preferably of about one second duration. In carrying out this invention, integrated circuits U1A and U1B are employed, one as a master timer and the other as a slave timer, both of which are Monolithic Timing Circuits, Type LM 556 manufactured by Texas Instruments, a schematic thereof being shown in FIG. 15. These are highly stable controllers capable of producing accurate time delays or oscillations, with terminals provided for triggering, and with a free running frequency and the duty cycle accurately controlled by external resistors and a capacitor. The output at timer U1A pin 5 is conducted to a decade counter U2 direct feed and to timer U1B through a differentiating circuit made up of a capacitor 34 in series and a resistor 14 from the positive 10.5 v of the power supply. In carrying out this invention, integrated circuit U2 is a CD 4017 Decade Divider manufactured by Texas Instruments, a schematic thereof being shown in FIG. 16 of the drawings. This divider consists of a five stage Johnson decade counter and an output decoder which converts the Johnson binary code to a decimal number. Timer U1B is a slave timer that is responsive to master timer U1A and is employed as a monostable one-shot with a time constant set by resistor 13 and capacitor 32, setting the timer U1B output pulse from pin 9 to approximately 1.8 second duration with a 10 volt analogous signal at pin 11, the pulse decreasing linearly to 1/5 second with less than one volt applied at pin 11.

The pulse width modulation timer output (PWM) at pin 9 of timer U1B is connected directly to pin 9 of an operational amplifier U5C employed as a voltage comparator-inverter. In carrying out this invention, the comparator-inverter U5C is a Quadruple Operational Amplifier Type LM 324 manufactured by Texas Instruments (see FIG. 14). The resistance ratio of resistors R11 and R12 fixes the voltage at pin 10 to 5.25 Volts. Therefore, when the voltage from the timer U1B changes state at the negative input of amplifier U5C, the output voltage thereof is inverted and changes state only when the voltage at pin 9 is higher, and lower than 5.25 volts, in order to produce a correct logic, and to ensure turn-on and turn-off of the pulse controlling transistor T1. Pin 8 of operational amplifier U5C feeds transistor T1 through a current limiting resistor R6, thereby modulating the charging voltage to the battery under charge. Accordingly, a variable pulse width is produced at pin 9 of slave timer U1B, between a maximum 90% duty cycle (top graph FIG. 6d) and a minimum 10% duty cycle (see FIG. 6b).

Figure 7:
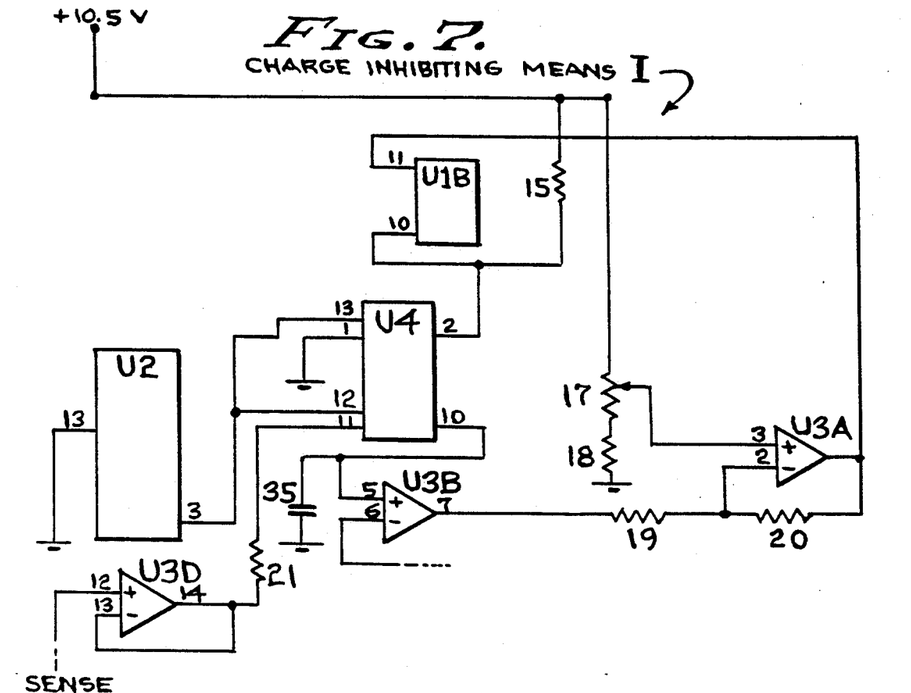
FIG. 7 is a schematic of the charge inhibiting means I.
Figure 17:
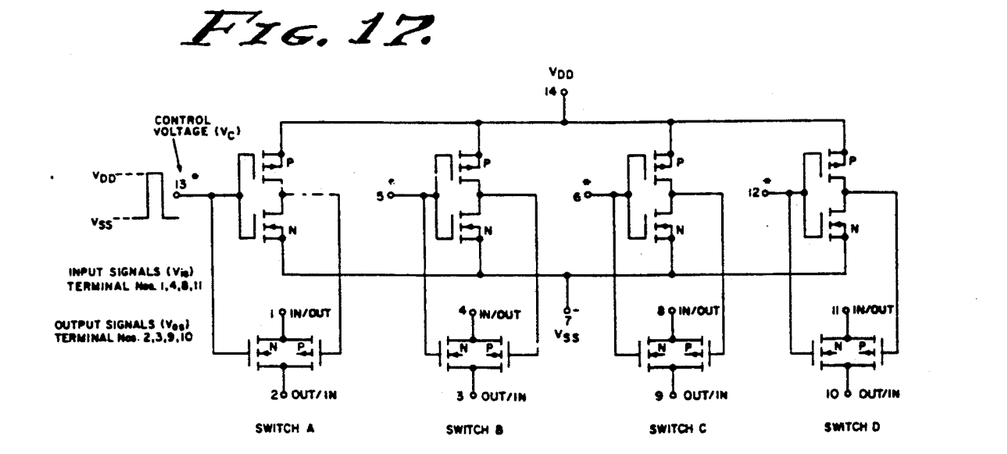
FIG. 17 is a schematic of the quad switch U4 that is employed.

Referring now to the charge inhibiting means I, and particularly to FIG. 7 of the drawings, the power source is +10.5 v from voltage regulator U6 of the power means P. The purpose of means I is to give full cyclic charging current to the battery under charge until the 70%-77% charge is reached, and then to taper the pulse width by diminishing its linearity until the battery is fully charged, thereby keeping the battery cool while applying a fast charge thereto. A sample and hold circuit is provided to intermittently sense voltage through the operation of field effect transistor (FET) switches of an integrated circuit U4. In carrying out this invention, this integrated circuit is a Quad Bilateral Switch CD4016 manufactured by Texas Instruments, a schematic thereof being shown in FIG. 17. This quad switch U4 is employed herein as a modulating switch means that controls the slave timer U1B. In accordance with this invention, the integrated circuit U2 is a decade counter configured for a count of five with a carry count employed to enable a sample and hold circuit and to disable the one shot timer U1B through the quad switch U4 FET switches. A logic high signal from pin 3 of the decade counter U2 is connected to pins 12 and 13 of U4. The pin 13 logic signal enables a field effect transistor therein at pin 2 that grounds reset pin 10 of U1B through the electronic connection made between pins 1 and 2 within U4 to ground. The sample and hold circuit is enabled through the logic high signal fed to pin 12 of U4 from pin 3 of U2 to enable pin 11 that connects a battery voltage sense buffer amplifier U3D (an LM324 operational amplifier, see FIG. 14) configured with unity gain, and enables pin 10 to a sampling capacitor 35 and comparing the enabling signal to the battery voltage while the carry count is high. When the carry count logic goes to a logic low, capacitor 35 is disconnected from the buffer amplifier U3D and holds the sensed battery voltage across its terminals for the duration of a determined number of charging cycles, for example four charging cycles. Amplifier U3B (an LM324 operational amplifier, see FIG. 14) from pin 10 of U4, a buffer amplifier with unity gain and is connected to an operational amplifier U3A (also an LM324 amplifier, see FIG. 14) through a resistor 19. Amplifier U3A is configured as an inverting and gain controlled amplifier subject to the ratio of resistors 20 and 19 setting its gain of 19.3. The ratio of variable resistors 17 and 18 set the voltage at which this gain starts. The sample and hold signal at pin 7 of U3B is shown in the graph of FIG. 6d). The straight line equation is $Y = MX + B$ wherein Y equals the output, X is the input, and M is the ratio of resistors 19 and 20. B is the offset voltage and is determined by the ratio of resistors 17 and 18. As a result, full cyclic charging current at the battery B under charge is ensured until the 70%-77% charge level in the battery is reached, and after which the pulse width tapers off linearly until the battery is fully charged, thereby keeping the battery cool while permitting a substantially fast charge. The output pulse of amplifier U3A is fed to the pulse width port 11 of U1B, completing the pulse inhibiting control loop.

Figure 8:
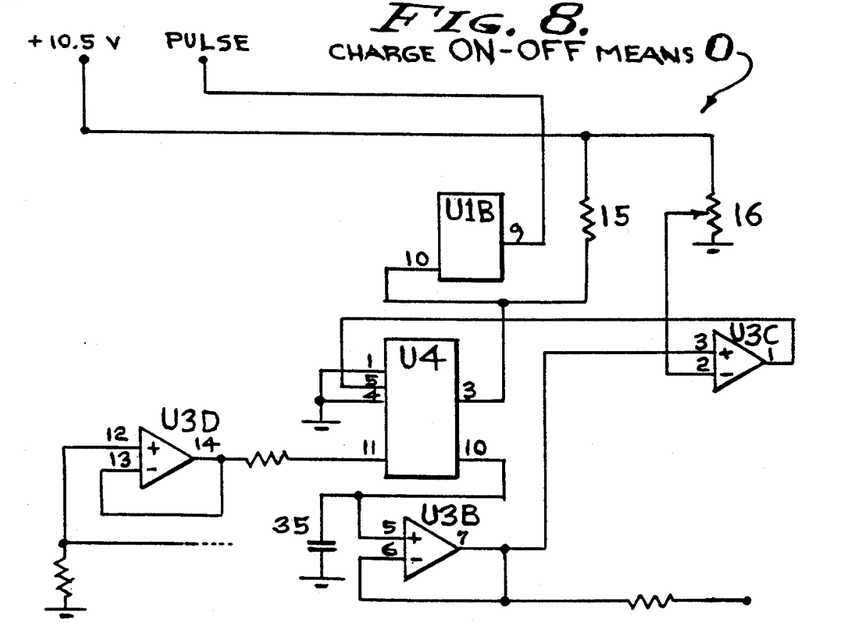
FIG. 8 is a schematic of the charge ON-OFF means O.

Referring now to the charge ON-OFF means O, and particularly to FIG. 8 of the drawings, the power source is +10.5 v from the voltage regulator U6 of the power supply means P. The purpose of means O is to enable the field effect transistor switch of U4 to turn OFF the charge voltage when the battery voltage is sensed through the buffer amplifier U3D at pin 11 of U4 as greater than the voltage set by potentiometer 16. As shown, the sample and hold voltage at pin 7 of amplifier U3B is connected to pin 3 of an operational amplifier U3C (an LM324 operational amplifier, see FIG. 14) as a comparator. The voltage operating port of U3C is adjustably set as may be required by the potentiometer 16, dependent upon the battery B voltage acceptance capability. When the voltage at pin 3 of U3C is greater than the voltage at pin 2 thereof, the output pin 1 goes high. This logic signal is connected to the FET switch controlling pin 5 of U4, thereby enabling the FET switch at pins 3 and 4 and grounding pin 10 of U1B so as to hold the U1B output low for the period of battery voltage sensed to be greater than the voltage set at pin 3 of U3C by the adjustment of the potentiometer 16. Accordingly, the charge voltage or pulse at pin 9 of the slave timer U1B is turned OFF when the sensed battery voltage exceeds the adjusted (16) voltage.

Figure 9:
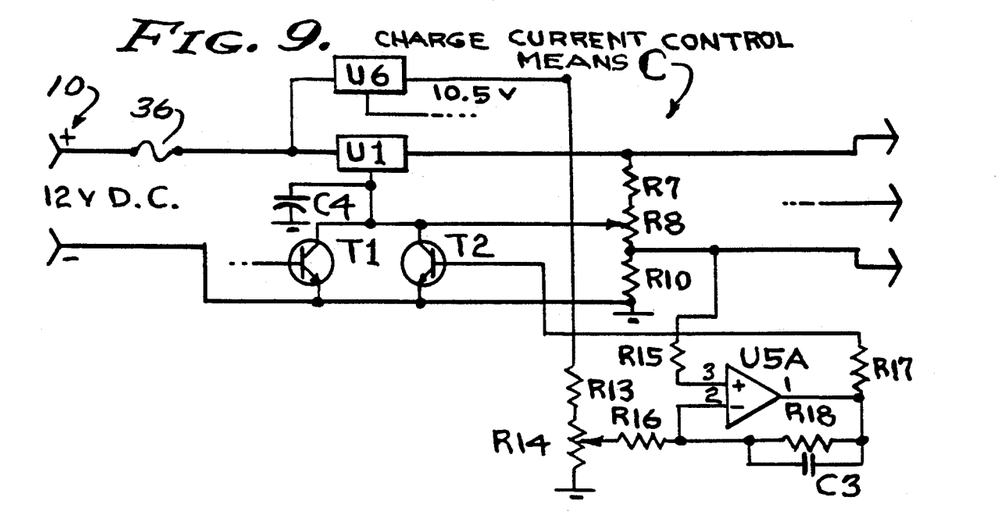
FIG. 9 is a schematic of the charge current control means C.

Referring now to the charge current control means C, and particularly to FIG. 9 of the drawings, the power source is +10.5 v from the voltage regulator U6 of the power supply means P. The purpose of means C is to adjustably limit the maximum charge current applied to the battery B under charge. As shown, a fixed value resistor R10 is the current sense element placed ahead of the amplifier U5A (see FIG. 14), configured with gain control and an offset voltage point. Pin 3 is connected to the positive side of resistor R10 and pin 2 is connected to a voltage reference set by a potentiometer R14. The gain of this amplifier is controlled by the ratio of resistors R18 and R16, which is 1.5. When enough internal resistance drop develops across resistor R10 (the maximum current point) or when pin 3 voltage is greater than pin 2 voltage, then output pin 1 of U5A goes high and its signal is fed through resistor 17 to transistor T2 which modulates the charge pulse, thus limiting the charging current to the battery B under charge, as may be required.

Figure 10:
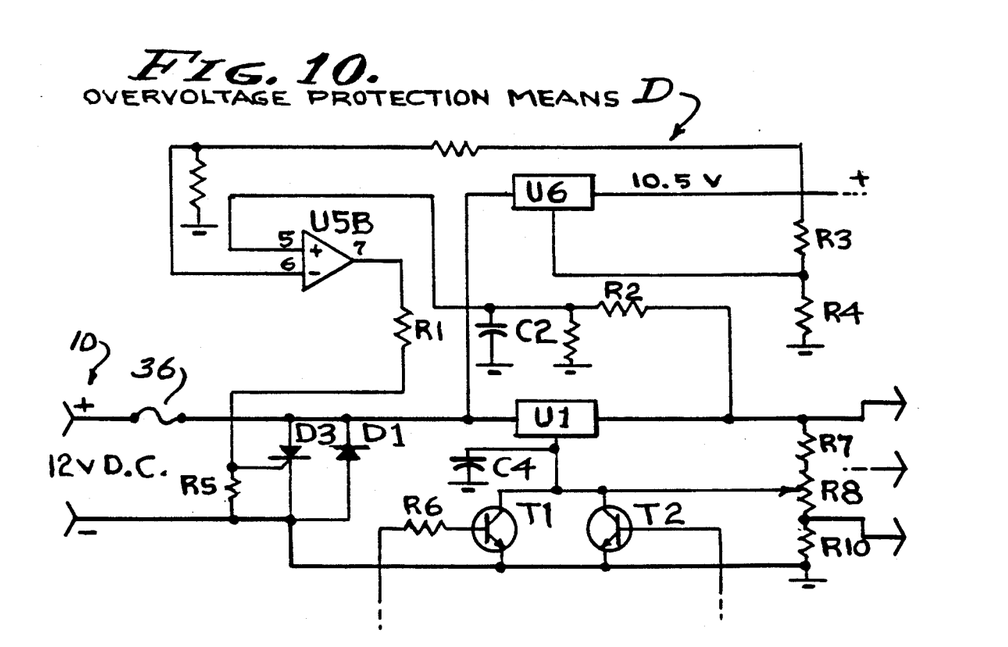
FIG. 10 is a schematic of the overvoltage protection means D.

Referring now to the overvoltage protection means D, and particularly to FIG. 10 of the drawings, this means is in the power source circuit and senses the voltage applied to the positive power bus. As shown, there is amplifier U5B (see FIG. 14) employed as a voltage comparator with its input pin 5 connected through a voltage divider and a time constant capacitor C2 to the positive battery charging bus. Output pin 6 is connected to the adjust pin of voltage regulator U6 through a voltage divider made up of resistors R3 and R4. When pin 5 senses a voltage higher than the pin 6 voltage, the output of U5B goes high and sends a signal through a current limiting resistor R1 to the gate of a silicon control diode(SCR) D3 employed as a "crowbar", turning it ON and thereby shorting out the power source and causing the line fuse 36 to blow. A resistor R5 to the negative power source line is of a low ohm value so as to keep the SCR from triggering on noise.

Figure 11:
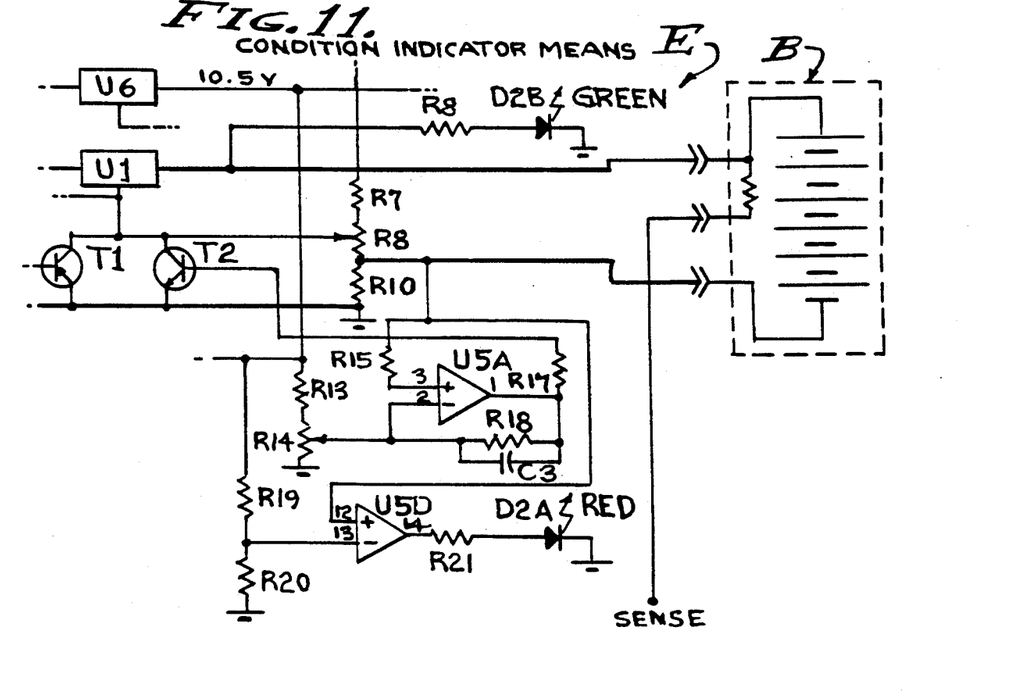
FIG. 11 is a schematic of the condition indicator means E.

Referring now to the condition indicator means E, and particularly to FIG. 11 of the drawings, this means displays the automatic operations of the overall system, to alert one as to (1) when the system is ON and whether the battery B is installed, (2) when the system is charging and to what degree, (3) when the battery is shorted, and (4) when the battery B is fully charged. A tricolor light emitting diode (LED) is employed, the color GREEN indicating that charging voltage is applied, the color ORANGE indicating proper operation of the system, and the color RED indicating a shorted battery No light indicates an open circuit. As shown, an operational amplifier U5D (see FIG. 14) is employed as a voltage comparator with an offset point determined by the ratio of resistors R19 and R20. When the voltage present at pin 12 is higher than the voltage at pin 13, the output pin 14 goes high and conducts current to the RED element D2A of the tricolor LED through a current limiting resistor R21. This circuit is designed to give a verification of current flow only to the battery under charge. The GREEN element D2B is connected to the positive battery charging bus through a current limiting resistor R8 and indicates when charging voltage is present at the battery terminals. When the circuit is working properly this tricolor LED will indicate ORANGE with both elements D2A and D2B illuminated. However, when the battery is shorted only element D2A is illuminated. And when the circuit is open or the battery is defective, only the GREEN element D2B will be illuminated.

Figure 12:
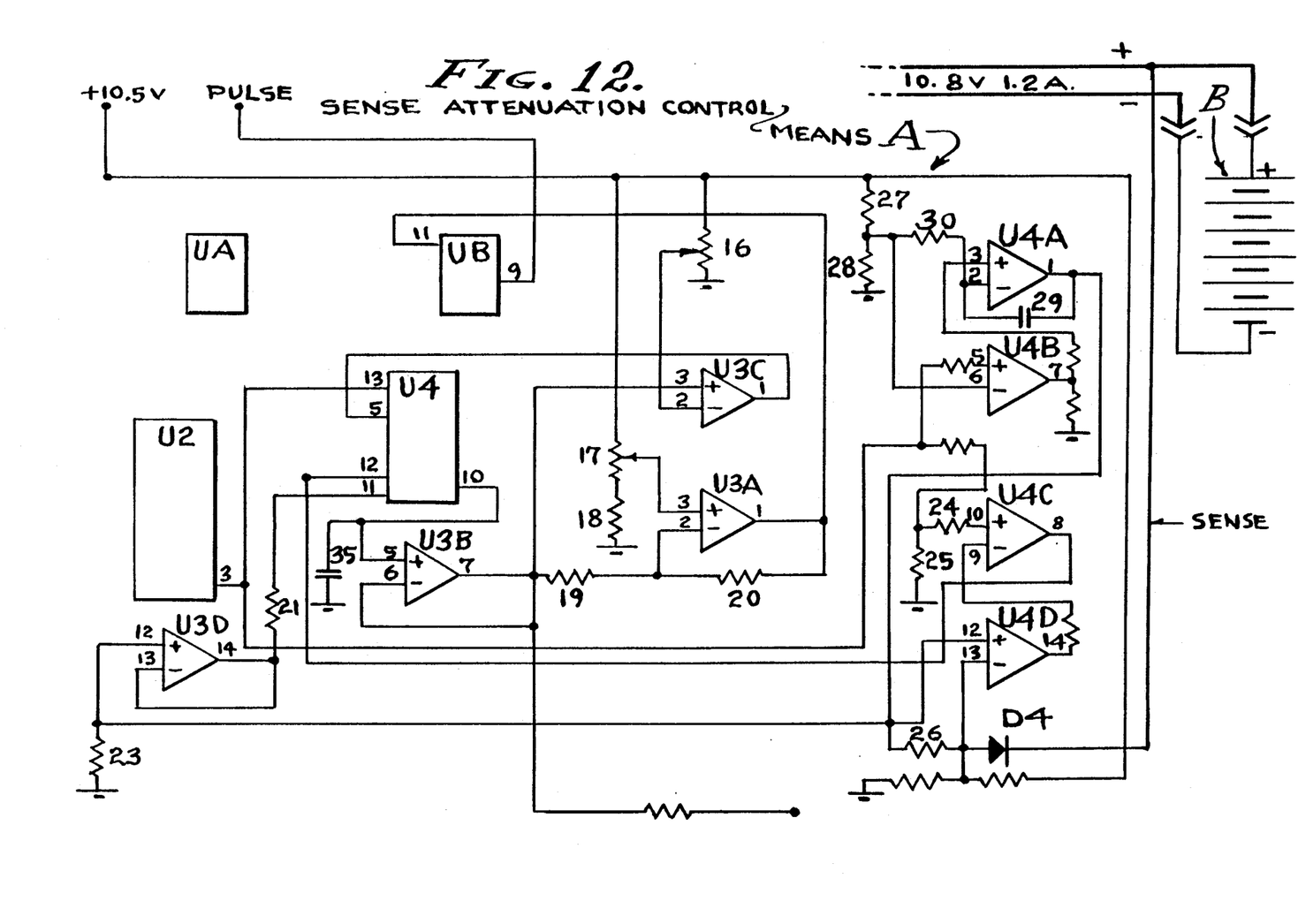
FIG. 12 is a schematic of the charge control means A, for universal battery application.

Referring now to FIG. 12 of the drawings, the charge controlling amplifier network U3A-U3D is supplemented to include an amplifier network U4A-U4D, whereby the battery charging system is universally adaptable to all presently known batteries of the type under consideration. The system hereinabove described is for a three contact battery unit that senses cell condition through a protective circuit contact one of the battery terminals. The supplemental means A next to be described is for universal application to either three contact or two contact battery units, with or without protective circuitry, typically comprised of resistors and/or thermistors at the positive pole thereof. FIG. 12 illustrates the essential components of this voltage sense attentuation means A combined with the charge controlling amplifier network U3A-U3D hereinabove described. Means A involves operational amplifiers U4A-U4D, each of which is an LM324 operational amplifier (see FIG. 14) combined as follows:

Operational amplifier U4B receives a 1.8 second pulse from pin 3 of decade counter U2 on the fifth cycle or voltage sense cycle at its pin 5. Pin 6 of U4B is biased at 5.25 volts through a voltage divider comprised of resistors 27 and 28, so that when pin 5 goes above this voltage the output pin 7 of U4B goes high and is fed to operational amplifier U4A which is employed as an integrator or voltage ramp generator. Pin 2 of U4A is biased at 5.25 volts from the same source as U4B and when its pin 3 goes high the output at pin 1 goes high very slowly through the negative feed-back of capacitor 29 and resistor 30, thereby establishing a rise time for said feed-back of about 1.8 second, and thereby producing a ramp (see FIG. 6d). This ramp is fed to the battery B under charge, through a resistor 26 and a current directional diode D4. Accordingly, a pulse window is developed by the action of operational amplifier U4C which is employed as a voltage comparator. The sense signal, the fifth pulse, generated from the decade counter U2 at pin 3 is fed through a resistor 24 of a voltage divider comprised of resistors 24 and 25 and to pin 10 of U4C, causing pin 8 of U4C to go high and thereby turn ON the FET switch or gate at pin 12 of U4. Pin 11 of U4 receives the ramp voltage from the buffer amplifier U3D employed with a gain of 1, and this ramp voltage appears across the sample and hold capacitor 35. When the ramp voltage reaches the battery B voltage, current begins to flow through resistor 26. This ramp voltage is applied to the operational amplifier U4D which then goes high at pin 14. This high voltage is applied to pin 9 of amplifier U4C and causes its output pin 8 to go low thereby turning OFF the FET switch at U4, the sample and hold circuit. The capacitor 35 will now hold this battery voltage until the next sample is taken (see FIG. 6d, lower graph).

From the foregoing it will be understood that I have provided a universal battery charging system that accommodates two terminal and three terminal batteries. The system is adjustable to the battery charge acceptance capability, without overheating the battery, by decreasing the pulse width with a commensurate decrease in current input while widening the dwell period for recuperation of the battery chemistry for the reception of current during the following charge pulse. In practice, the pulse period is constant at approximately two seconds (1.8 seconds in the specified embodiment). That is, each maximum square wave pulse as illustrated in FIG. 6d is a 90% duty cycle two second pulse (1.8 sec.). This maximum charge cycle persists until a determined charge condition of the battery is reached, for example herein a 7.2 volt charge condition in a 9 volt nickel cadmium battery, after which the charge is diminished in a straight line function as illustrated in FIG. 5. This is accomplished by reducing the pulse width and increasing the dwell as illustrated in FIGS. 6b and 6e. A feature is the ramp time as illustrated in FIG. 6d, established by the carry count as illustrated in FIG. 6c. Accordingly, the current charge is reduced as full battery charge is approached, and finally turned OFF when a full charge is reached. It is during the carry count the battery condition is sensed.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A pulse modulated battery charging system having charge pulses and dwell therebetween for charging a battery, and characterized by shortening the charge pulses and lengthening the dwell therebetween in proportion to the closeness of the battery reaching full charge whereupon charge current is turned OFF, and including:

a power supply means having a battery charge bus and an operational bus and dual voltage regulation for supplying the battery charge bus with amperage at a given voltage, and supplying the operational bus with an operational amperage and voltage bias, a pulse width modulator means for producing uniformly timed pulses of varied width and dwell between pulses, and having an ON-OFF switch means controlling the battery charge bus, a charge inhibiting means for determining a pulse width and dwell acceptable to the battery under charge, in response to a sense circuit from said battery during said dwell, a charge ON-OFF means responsive to the charge inhibiting means for ON-OFF control of the switch means controlling the pulse width modulator means, and a charge current control means for limiting the maximum current applied through the charge bus to the battery under charge, and wherein the charge bus and operational bus of the power supply means are each in circuit with a regulator means adjustable to supply said amperage at a given voltage, the regulator means having resistors and positive and negative charge conductors electrically connected to battery charging terminals for voltage control, said resistors operable to set maximum voltage of said regulator means.

2. The pulse modulated battery charging system as set forth in claim 1, wherein said resistors define a voltage divider and said current through the positive and negative conductors to the battery charging terminals is limited by a current sensing resistor in series with one of said conductors, maximum current being set by a differential amplifier means adjusted to sense voltage drop across said voltage divider disposed between the positive and negative charge conductors and said current sensing resistor in series therein and modulating an ON-OFF transistor switch in series with said one of said positive and negative charge conductors.

3. A pulse modulated battery having charge pulses and dwell therebetween for charging a battery, and charging system characterized by shortening the charge pulses and lengthening the dwell therebetween in proportion to the closeness of the battery reaching full charge whereupon charge current is turned OFF, and including;

- a power supply means having a battery charge bus and an operational bus and dual voltage regulation for supplying the battery charge bus with amperage at a given voltage, and supplying the operational bus with an operational amperage and voltage bias.
- a pulse width modulator means for producing uniformly timed pulses of varied width and dwell between pulses, and having an ON-OFF switch means controlling the battery charge bus,
- a charge inhibiting means for determining a pulse width and dwell acceptable to the battery under charge, in response to a sense circuit from said battery during said dwell
- a charge ON-OFF means responsive to the charge inhibiting means for ON-OFF control of the switch means controlling the pulse width modulator means,
- and a charge current control means for limiting the maximum current applied through the charge bus to the battery under charge,
- and wherein the battery has a charge condition represented by a voltage and wherein the pulse width modulator means is comprised of a master timer means with an output producing a 50% duty cycle time constant square wave pulse fed through a differentiating circuit to a slave timer means, having a square wave output, the slave timer means being responsive to the master timer means to produce a time constant square wave pulse decreasing linearly in response to an analogous increase in said voltage representing battery charge condition, there being an operational amplifier means responsive to linearity of the slave timer means square wave output and modulating an ON-OFF transistor switch in series with the battery charge bus.

4. The pulse modulated battery charging system as set forth in claim 3, wherein the slave timer means is a monostable one-shot with a time constant set by a resistor and a capacitor, setting its output pulse.

5. A pulse modulated battery having charge pulses and dwell therebetween for charging a battery, an charging system characterized by shortening the charge pulses and lengthening the dwell therebetween in proportion to the closeness of the battery reaching full charge whereupon charge current is turned OFF, and including:

- a power supply means having a battery charge bus and an operational bus and dual voltage regulation for supplying the battery charge bus with amperage at a given voltage, and supplying the operational bus with an operational amperage and voltage bias,
- a pulse width modulator means for producing uniformly timed pulses of varied width and dwell between pulses, and having an ON-OFF switch means controlling the battery charge bus.
- a charge inhibiting means for determining a pulse width and dwell acceptable to the battery under charge, in response to a sense circuit from said battery during said dwell
- a charge ON-OFF means responsive to the charge inhibiting means for ON-OFF control of the switch means controlling the pulse width modulator means.
- and a charge current control means for limiting the maximum current applied through the charge bus to the battery under charge,
- and wherein the charge inhibiting means is comprised of field effect transistor switch means responsive to a decade counter means with a carry count that enables a sample and hold circuit to sense battery voltage during said dwell.

6. The pulse modulated battery charging system as set forth in claim 4, wherein the charge inhibiting means is comprised of field effect transistor quad switch means responsive to a decade counter means that enables a sample and hold circuit to disable the one-shot slave timer means for decreasing pulse width according to increase in battery voltage sensed by said sample and hold circuit during said dwell.

7. The pulse modulated battery charging system as set forth in claim 4, wherein the charge inhibiting means is comprised of field effect transistor quad switch means responsive to a decade counter means that enables a sample and hold circuit and to disable the one-shot slave timer means for decreasing pulse width according to increase in battery voltage sensed by said sample and hold circuit through an operational amplifier means during said dwell.

8. The pulse modulated battery charging system as set forth in claim 4, wherein the charge inhibiting means is comprised of field effect transistor quad switch means responsive to a decade counter means that enables a sample and hold circuit and disables the one-shot slave timer means for decreasing pulse width, there being a sampling capacitor enabled by the quad switch means to hold sensed battery voltage, and an operational amplifier means having an output voltage adjusted by a variable resistor for comparison with the sensed battery voltage and determining the maximum voltage at which the one-shot slave timer means is disabled.

9. The pulse modulated battery charging system as set forth in claim 4, wherein the charge inhibiting means is comprised of field effect transistor quad switch means responsive to a decade counter means that enables a sample and hold circuit and disables the one-shot slave timer means for decreasing pulse width according to increase in sensed battery voltage during said dwell, there being a sampling capacitor enabled by the quad switch means to hold said sensed battery voltage, and an operational amplifier means with unity gain in circuit with said sampling capacitor and with its output connected through a voltage divider to an operational amplifier inverter means with adjusted voltage for comparison with said sensed battery voltage and determining the maximum voltage at which the one-shot slave timer means is disabled.

10. A pulse modulated battery charging system having charge pulses and dwell therebetween for charging a battery, and characterized by shortening the charge pulses and lengthening the dwell therebetween in proportion to the closeness of the battery reaching full charge whereupon charge current is turned OFF, and including:
- a power supply means having a battery charge bus and an operational bus and dual voltage regulation for supplying the battery charge bus with amperage at a given voltage, and supplying the operational bus with an operational amperage and voltage bias,
- a pulse width modulator means for producing uniformly timed pulses of varied width and dwell between pulses, and having an ON-OFF switch means controlling the battery charge bus,
- a charge inhibiting means for determining a pulse width and dwell acceptable to the battery under charge, in response to a sense circuit from said battery during said dwell,
- a charge ON-OFF means responsive to the charge inhibiting means for ON-OFF control of the switch means controlling the pulse width modulator means,
- and a charge current control means for limiting the maximum current applied through the charge bus to the battery under charge,
- said charge ON-OFF means being comprised of an operational amplifier comparator means for comparing battery voltage sensed and with its output connected through field effect transistor switch means for ON-OFF control of the battery charge bus,
- and wherein said operational amplifier comparator means has unity gain and is adjustably set by a potentiometer to voltage acceptance capability of the battery under charge.

11. A pulse modulated battery charging system having charge pulses and dwell therebetween for charging a battery, and characterized by shortening the charge pulses and lengthening the dwell therebetween in proportion to the closeness of the battery reaching full charge whereupon charge current is turned OFF, and including:
- a power supply means having a battery charge bus and an operational bus and dual voltage regulation for supplying the battery charge bus with amperage at a given voltage, and supplying the operational bus with an operational amperage and voltage bias,
- a pulse width modulator means for producing uniformly timed pulses of varied width and dwell between pulses, and having an ON-OFF switch means controlling the battery charge bus,
- a charge inhibiting means for determining a pulse width and dwell acceptable to the battery under charge, in response to a sense circuit from said battery during said dwell,
- a charge ON-OFF means responsive to the charge inhibiting means for ON-OFF control of the switch means controlling the pulse width modulator means,
- and a charge current control means for limiting current applied through the charge bus to the battery under charge,
- said charge ON-OFF means being comprises of an operational amplifier comparator means having a voltage operating port set to voltage acceptance capability of the battery under charge for comparing battery voltage with battery output connected through field effect transistor switch means for ON-OFF control of the battery charge bus,
- and wherein the battery voltage to be compared is sensed by a buffer amplifier means through the field effect transistor switch means.

12. A pulse modulated battery charging system having charge pulses and dwell there between for changing a battery, and characterized by shortening the charge pulses and lengthening the dwell therebetween in proportion to the closeness of the battery reaching full charge whereupon charge current is turned OFF, and including:
- a power supply means having a battery charge bus and an operational bus and dual voltage regulation for supplying the battery charge bus with amperage at a given voltage, and supplying the operational bus with an operational amperage and voltage bias,
- a pulse width modulator means for producing uniformly timed pulses of varied width and dwell between pulses, and having an ON-OFF switch means controlling the battery charge bus,
- a charge inhibiting means for determining a pulse width and dwell acceptable to the battery under charge, in response to a sense circuit from said battery during said dwell,
- a charge ON-OFF means responsive to the charge inhibiting means for ON-OFF control of the switch means controlling the pulse width modulator means,
- and a charge current control means for limiting a maximum current applied through the charge bus to the battery under charge,
- and wherein the charge current control means is comprised of an operational amplifier with gain control and an offset voltage point and having a voltage operating port from a fixed resistor to the battery charge bus, and responsive to resistance drop in said resistor when said maximum current is reached.

13. A pulse modulated battery charging system having charge pulses and dwell therebetween for charging a battery, and characterized by shortening the charge pulses and lengthening the dwell therebetween in proportion to the closeness of the battery reaching full charge whereupon charge current is turned OFF, and including:
- a power supply means having a battery charge bus and an operational bus and dual voltage regulation for supplying the battery charge bus with amperage at a given voltage, and supplying the operational bus with an operational amperage and voltage bias,
- a pulse width modulator means for producing uniformly timed pulses of varied width and dwell between pulses, and having an ON-OFF switch means controlling the battery charge bus,
- a charge inhibiting means for determining a pulse width and dwell acceptable to the battery under charge, in response to a sense circuit from said battery during said dwell,
- a charge ON-OFF means responsive to the charge inhibiting means for ON-OFF control of the switch means controlling the pulse width modulator means,
- and a charge current control means for limiting a maximum current applied through the charge bus to the battery under charge,
- and including an overcharge protection means responsive to voltage in the battery charge bus and comprised of an operational amplifier means with an input connected through a voltage divider and a time constant capacitor to said battery charge bus and with an output to of a voltage regulator connected with said charge bus, and responsive to a high bus voltage at its said input to cause its said output to go high and apply a signal to a silicon control diode shorting a fused bus circuit.

14. A pulse modulated battery charging system having charge pulses and dwell therebetween for charging a battery, and characterized by shortening the charge pulses and lengthening the dwell therebetween in proportion to the closeness of the battery reaching full charge whereupon charge current is turned OFF, and including:

- a power supply means having a battery charge bus and an operational bus and dual voltage regulation for supplying the battery charge bus with amperage at a given voltage, and supplying the operational bus with an operational amperage and voltage bias,
- a pulse width modulator means for producing uniformly timed pulses of varied width and dwell between pulses, and having an ON-OFF switch means controlling the battery charge bus,
- a charge inhibiting means for determining a pulse width and dwell acceptable to the battery under charge, in response to a sense circuit from said battery during said dwell,
- a charge ON-OFF means responsive to the charge inhibiting means for ON-OFF control of the switch means controlling the pulse width modulator means,
- and a charge current control means for limiting a maximum current applied through the charge bus to the battery under charge,
- and including a condition indicator means comprised of a tricolor light emitting diode having a GREEN element and a RED element, the GREEN element being in circuit with a positive bus leg for its energizing, and the RED element being in circuit with a negative bus leg and energized through an (as) operational amplifier comparator with an offset ratio to ground and an input from said negative bus leg and an output to said RED element, whereby an energized GREEN element indicates the presence of charging voltage, an ORANGE combination of energized GREEN and RED elements indicates proper charging, and an energized RED element indicates a shorted battery, no color indicating a fully charged battery.

15. A pulse modulated charging system having charge pulses and dwell therebetween for charging batteries having at least positive and negative terminals for the transmission of electrical power and battery condition sensing, the system being characterized by shortening the charge pulses and lengthening the dwell therebetween in proportion to the closeness of the battery reaching full charge whereupon charge current is turned OFF, and including:

- a power supply means having positive and negative battery charge busses and an operational bus and dual voltage regulation, for supplying said positive and negative battery charge busses connected to the respective positive and negative battery terminals with amperage at a given voltage, and for supplying an operational bus with an operational amperage and voltage bias,
- a pulse width modulator means for producing uniformly timed pulses of varied width and dwell between pulses, and having an ON-OFF switch means for controlling the battery charge busses,
- a charge inhibiting means for determining a pulse width and dwell acceptable to the battery under charge, in response to a sense circuit from a battery terminal during the dwell of a charge cycle and comprised of field effect transistor switch means responsive to a decade counter means with a carry count that enables a sample and hold circuit to sense battery voltage during a said dwell,
- a charge ON-OFF means responsive to the charge inhibiting means for ON-OFF control of the switch means controlling the pulse width modulator means,
- a charge current control means for limiting current applied through the positive and negative busses to the terminals of the battery under charge, and
- a sense attenuating means comprised of a network of amplifier means including a first operational amplifier means with its input connected to an output of said decade counter means and its output connected to a second operational amplifier means, having output connected the second amplifier means through a feedback capacitor to its input, thereby producing a voltage ramp that is connected to a terminal of the battery under charge and establishing a pulse width signal that is compared by a third operational amplifier comparator means enabled by the decade counter means at a carry count thereof and causing the field effect transistor switch means to turn ON the sample and hold circuit.

* * * * *